UNITED STATES PATENT OFFICE.

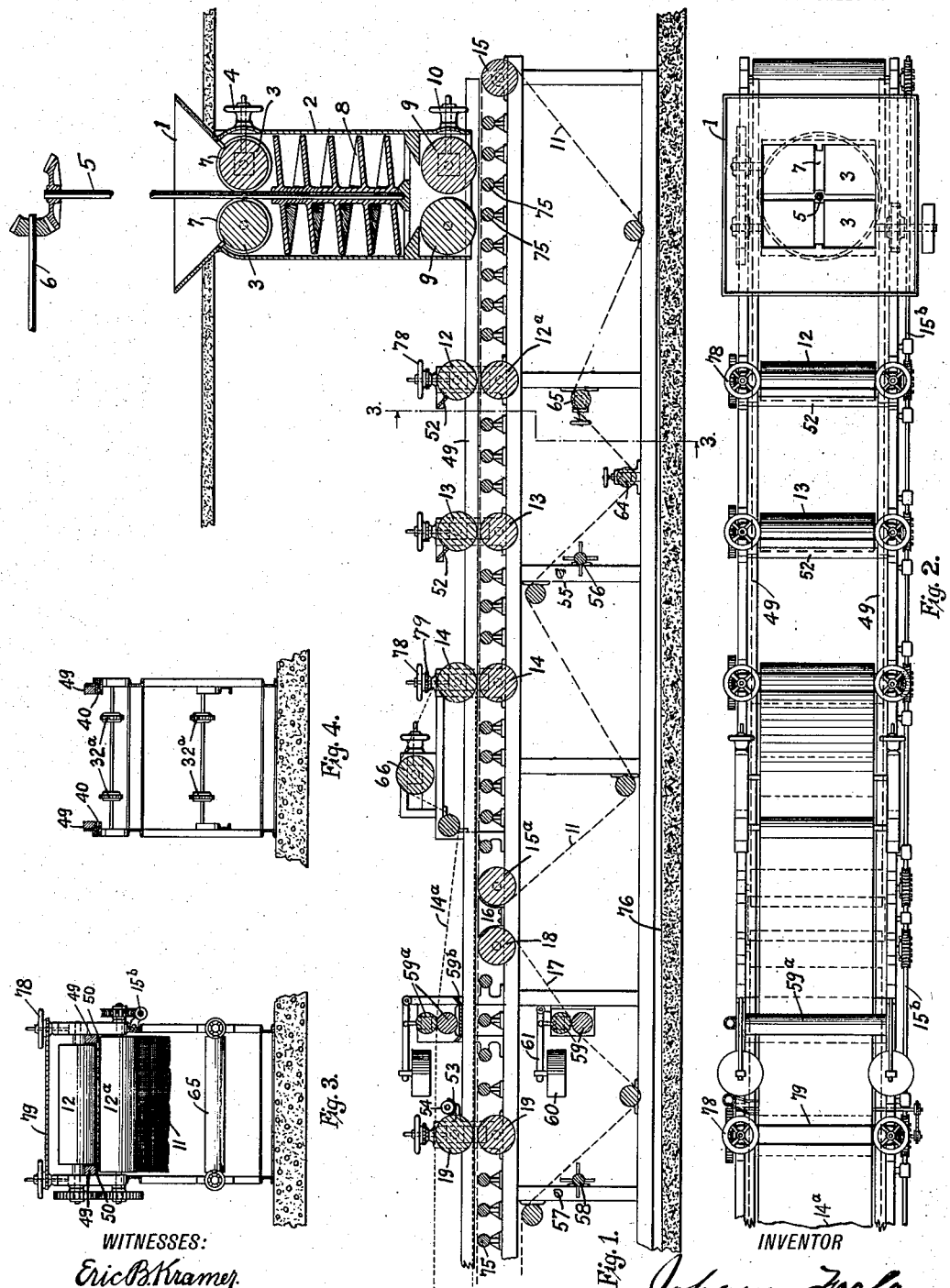

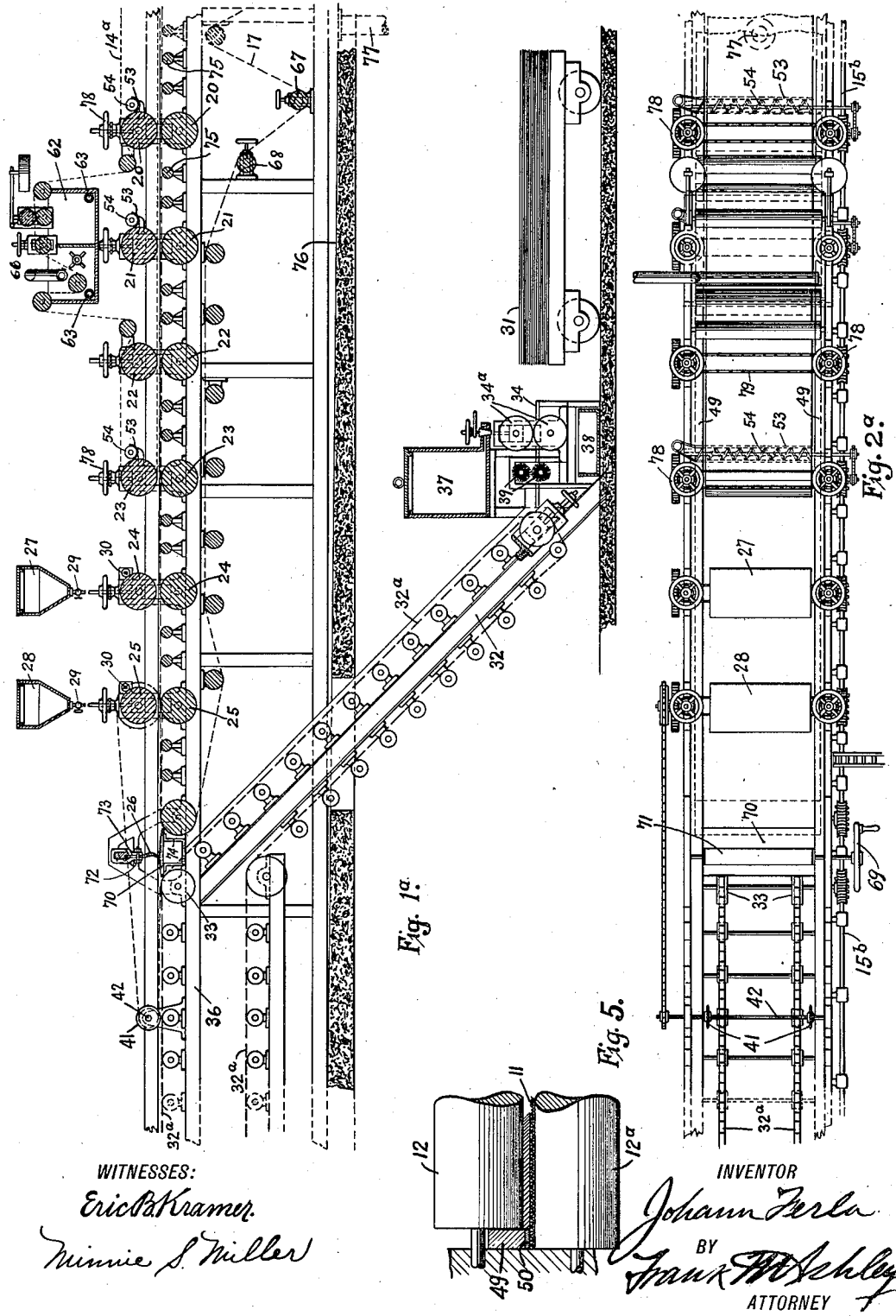

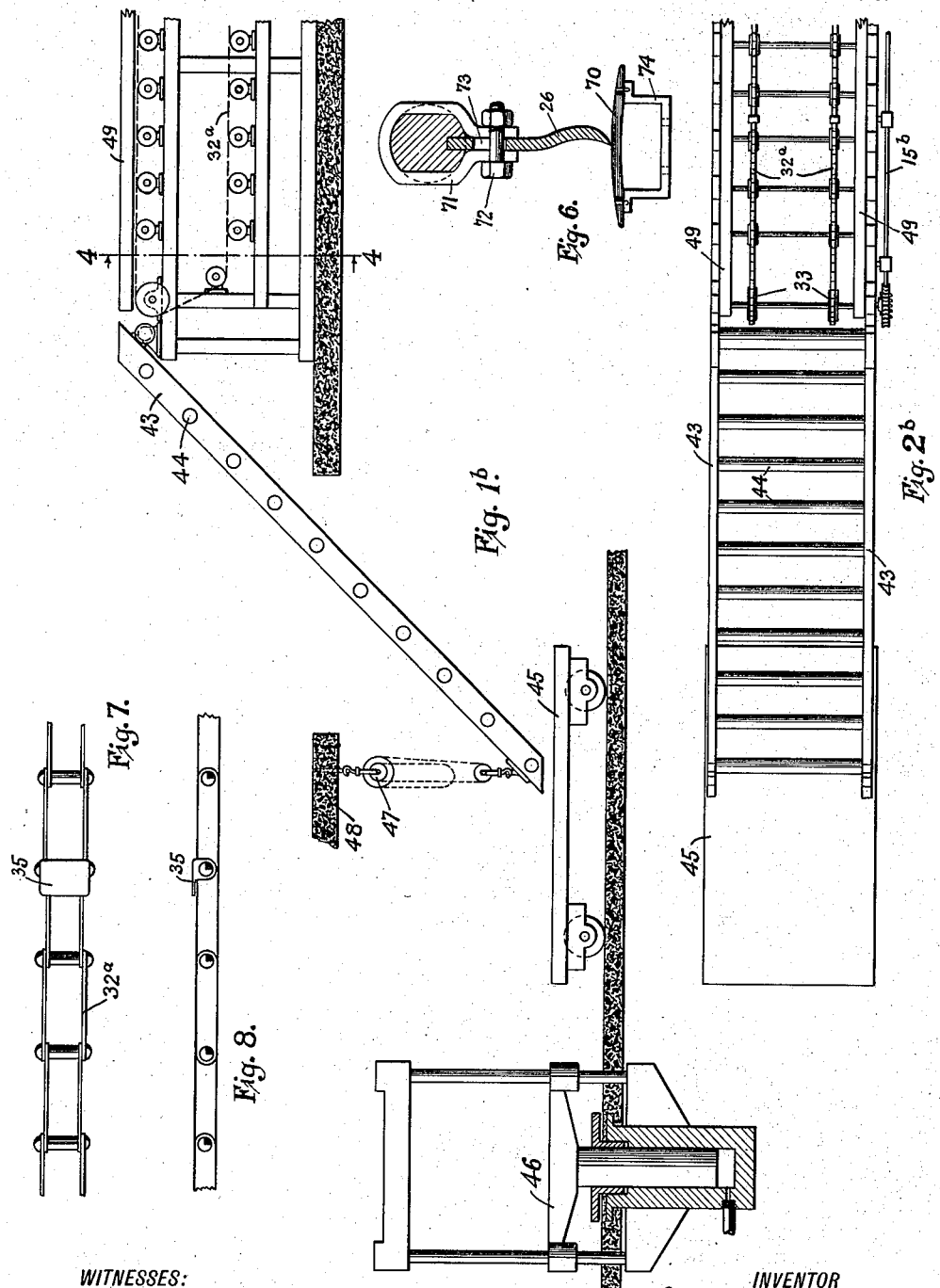

JOHANN FERLA, OF POUGHKEEPSIE, NEW YORK, ASSIGNOR TO AMERICAN MINERAL WOOD MANUFACTURING COMPANY, A CORPORATION OF NEW YORK.

APPARATUS FOR MANUFACTURING COMPOSITION BOARD.

1,199,683.

Specification of Letters Patent.

Patented Sept. 26, 1916.

Application filed July 15, 1912, Serial No. 709,438. Renewed May 27, 1916. Serial No. 100,378.

*To all whom it may concern:*

Be it known that I, JOHANN FERLA, a citizen of Switzerland, and a resident of Poughkeepsie, in the county of Dutchess and State of New York, have invented certain new and useful Improvements in Apparatus for Manufacturing Composition Board, of which the following is a specification.

This invention relates to apparatus for the manufacture of composition board from plastic material.

The principal object of this invention is to provide an apparatus of this character which is adapted to treat the plastic material when taken in a comparatively dry state.

A further object is to provide efficient means for extracting the moisture from the material and to prevent its adherence to the pressure rolls.

A further object of this invention is to provide means whereby the composition board before being subjected to its final pressure is automatically deposited upon a spacing plate which makes it possible to subject a plurality of layers of board to pressure simultaneously.

A still further object is to provide means for coating the material with a layer or film of non-adhesive material for the purpose of preventing the adhesion of the layers when they are subjected simultaneously to pressure.

Further objects and advantages will hereinafter appear.

In the accompanying drawings, Figures 1, 1ª and 1ᵇ are continuations of each other and illustrate a sectional elevation of my improved apparatus. Figs. 2, 2ª and 2ᵇ respectively are plan views of the construction illustrated in Figs. 1, 1ª and 1ᵇ. Fig. 3 is a section taken along line 3—3 of Fig. 1. Fig. 4 is a section taken along line 4—4 of Fig. 1ᵇ. Fig. 5 is a detail view on an enlarged scale, illustrating the construction of the rolls and guides shown in Fig. 3 and illustrating the passage of the belt and material therebetween. Fig. 6 is a detail illustrating the method of adjustment of the cutter knife. Fig. 7 is a fragmental detail illustrating the conveyer chain for the plates. Fig. 8 is an elevation of the structure illustrated in Fig. 7.

The material is first mixed in the proper proportions and given the proper amount of consistency before it is introduced into my improved apparatus. The latter is designed for handling the material in a comparatively dry state, containing considerably less moisture than the material handled in the apparatus disclosed in my prior Patent, No. 940,449 granted November 16th, 1909. The material after being so mixed and treated, is fed into hopper 1 in any suitable manner. Communicating with this hopper is a cylindrical chamber 2 in which are mounted a pair of rolls 3 which are rotated in the direction to feed the material downward from the hopper 1. Rolls 3 may be adjusted relatively to each other by any desired adjusting means as 4. A shaft 5, driven through suitable gearing from the shaft 6, connected to any available source of power, extends past the rolls 3 which are grooved at 7 to accommodate the passage of the shaft therebetween, and rotates a screw conveyer 8 which feeds the material downward as it is deposited thereon by the rolls 3. Mounted below the screw conveyer are a pair of steel rolls 9 adjustable to and from each other by any desired adjusting means 10. These rolls roughly gage the thickness of the sheet of material which ultimately forms the composition board. The material thus fed out from the conveyer is comparatively dry but still has more moisture than is desirable for purposes of the final compression thereof and drying. In order to remove this surplus moisture, the sheet of material after passing from the rolls 9 is deposited upon an endless belt 11 formed of canvas or like absorbent material and is fed through a pair of steel rolls 12 and 13, by means of which rolls the sheet is slightly compressed thus expressing the moisture therefrom which is absorbed by the absorbent material of the belt and also gaging the thickness of the sheet. It is found that the material when thus handled, while it is in a comparatively dry state, is very sticky and is liable to adhere to the surface of the presser rolls. To avoid this sticking of the material and also to increase the efficiency of the moisture extracting operation, the sheet after passing rolls 13, is passed between rolls 14, the upper of which has an endless belt 14ª of a more absorbent material than canvas such as felt passing thereover. From this point on, the material is not contacted directly by the rolls but is contacted above and below by two belts of absorbent material which absorb the moisture therefrom both from below and above and also effectually prevent any of the material sticking to the rollers. The canvas belt is driven by its end rolls 15 and 15$^a$ which are connected to any suitable source of power as a shaft 15$^b$ running the length of the machine and geared to these rolls by any suitable gearing.

The material after passing roll 15$^a$ is fed along past the bridging plate 16 on to the endless belt 17 driven by the roll 18. This belt may be also of felt or like absorbent material, and together with the felt belt 14$^a$, it removes the moisture from the material so far as it is possible to do so by the application of the absorbent material thereon. Rolls 14 already referred to and rolls 19, 20, 21, 22 and 23 which are spaced along the line of travel of the sheet between the belts, are adjustable toward and from each other and serve to compress the material between the absorbent belts to express the moisture therefrom.

After passing out from under the belt 14$^a$, the sheet is carried along by the belt 17 past the steel rolls 24 and 25 which gage the material to its final thickness before the hydraulic compression, and then the sheet is cut into the proper lengths by means of a knife 26, after which the individual lengths are conveyed to be piled one on top of the other and be subjected to the final compression by means of a hydraulic press. In order to prevent the adhesion of the sheets to each other when thus subjected to the final compression, I provide mechanism whereby the individual sheets as they are fed out are placed upon spacing plates from which they can be readily detached. This detachment is further assured by means of a coat of oil or like non-adhesive fluid with which I coat the sheets and plates before they are placed over each other. The coating of oil is applied on the top of the sheets by the gage rolls 24 and 25, which coating also prevents the sticking of the material to the rolls. The mechanism for performing these functions, is as follows: Mounted above the rolls 24 and 25 are oil reservoirs 27 and 28 having valves or pet-cocks 29 extending downwardly therefrom and supplying a regulatable amount of oil on the top of the rolls 24 and 25. Felt rolls or wipers 30 are mounted rearwardly of rolls 24 and 25 and spread the oil evenly upon the surface of the rolls. The sheet of material thus receives an even coating of oil on its upper surface as it passes between rolls 24 and 25. After the sheet passes off from the belt 17, it is deposited upon a steel plate 31 upon which it is carried and which acts as a spacer therefor when the sheets are piled on one another and compressed in the hydraulic press. These plates 31 are made of thin, flexible metal such as thin sheet steel and are conveyed to the conveying table in alinement with the sheets of material as follows: Extending upward preferably from a lower floor is an inclined conveyer 32 having a pair of endless chains 32$^a$ driven by sprocket wheels 33 from a convenient source of power as from the shaft 15$^b$ which drives the conveyer belts and the rolls 24 and 25, etc. Adjacent to the bottom end of the inclined conveyer 32 is a table or platform 34 having mounted thereon a pair of feed rolls 34$^a$ between which the plates 31 are placed and whence they are fed to the inclined conveyer 32 and are engaged by the hooks 35 formed on the chains 32$^a$ and conveyed to the table 36 forming a continuation of the table on which the sheets of material are carried. The oil reservoir 37 is provided adjacent to the point of entrance of the plates between the rolls 34$^a$ and a film of oil is deposited therefrom upon the upper surface of the plates 31 as they are fed through the rolls 34$^a$. A drip pan 38 is provided below the rolls 34$^a$ to catch the surplus of oil running off from the rolls and plates. Brushes 39 clean the plates below and above as they pass to the chains 32$^a$. Any desired means may be employed for placing the plates on the chains so as to cause the hooks to engage the bottom of the plates. If desired, this may be done manually by the attendant who feeds the plates to rolls 34. When the plates reach the table 36 they run into guides 40 formed below the guides for the sheets of material. The pressure exerted by the hooks 35 in feeding the plates upward will cause the latter to bend around so as to follow the horizontal path of the guides while their lower ends are engaged by the hooks 35. The plate in thus passing under the material and being fed simultaneously therewith at the same speed receives any desired length of material thereon which is determined by the operator. When a sufficient amount of material has passed upon a plate, the operator turns the knife so as to cut the requisite length which passes off on the plate conveyed by the chain 32$^a$. Rotary knives 41 mounted on the shaft 42 driven from any suitable source of power as from the roll 25, cut the material at its edges for the purpose of determining the proper width thereof. After the plate with the sheet of material thereon travels off from the chains 32$^a$, it is guided down an inclined run-way 43 having rollers 44 mounted thereon and is deposited upon any suitable carrier as a truck 45 which may be moved so as to convey the pile of sheets to the hydraulic press 46. The run-way 43 is adjustable up and down by any suitable hoisting device as a differential pulley 47 attached to a suitable support 48.

Referring to Figs. 3 and 5 which illustrate the manner in which the material is guided between the rolls, the belt 11 extends the full length of roll 12ª under the guide 49 which runs the full length of the table. This guide 49 is placed at each end of the upper rolls which they snugly contact. The lower edge of these guides is formed with a facing 50 of leather, rubber or some such comparatively soft material for contacting with the belt and minimizing wear thereon. The material is thus confined between the guides, facing, and belt and does not spread when compressed by the rolls for the purpose of expressing the moisture therefrom.

To prevent any accumulation of material upon the rolls, I provide a knife 52 for each of the steel rolls upon the forward side thereof and place at the proper angle to scrape any material which may adhere thereto. At the rear side of rolls 20, 21 and 23 are mounted troughs 53 having an edge bearing against the side of the roll to scrape away any particles of material adhering thereto. In these troughs are mounted conveyers 54 of any suitable type to carry the material scraped away to any suitable point for discharge. These troughs thus scrape off any fine material which may percolate through the belt and adhere to the rolls.

Any suitable means may be used for cleaning the belts and extracting the moisture therefrom after passing rearwardly or upwardly from the table on the return path. The canvas belt 11 may be washed by a stream of water played thereon by a nozzle 55 and the particles of material which may adhere thereto after the belt passes this nozzle will be finally removed by agitating the belt by means of an agitator 56 mounted at any suitable point below this nozzle. The belt 17 also has adjacent its run below the table, a nozzle 57 and an agitator 58 operating in the same manner as the corresponding parts for belt 11. After belt 17 travels past the nozzle and agitator, it passes through a pair of rolls 59, the upper of which is held yieldingly downward by means of a weight 60 on a lever 61 upon which this upper roll is mounted. A compression of the belt between these two rolls extracts the moisture therefrom and renders it comparatively dry and adapted to again extract moisture from the material which it is to contact. The belt 14ª also has a similar washing and moisture extracting apparatus which is mounted on a pan 62 having a pair of drains 63 for conducting away the cleansing liquid and also the moisture extracted from the belt after being cleaned. This belt also has additional moisture expressing means consisting of two rolls 59ª engaging the belt above and below and held yieldingly toward each other to express the belt by means of a weight mounted on a lever upon which the upper roll is journaled. A pan 59ᵇ is provided beneath the rolls to carry away the moisture extracted from the belt.

In Figs. 2, 2ª and 4, the upper belt 14ª and the upper rolls are shown for the sake of clearness as not contacting the side guides 49. However, it may be understood that this belt and the rolls contact snugly the side guides 49 as shown in Fig. 5 and thus prevent the material from spreading upwardly as it is compressed.

All of the belts have means for tightening them and maintaining them in proper alinement. The belt 11 has engaging its lower run a vertically adjustable roll 64 for the purpose of tightening the same and also an adjustable roll 65 which may be used to adjust the belt so as to cause it to run in proper alinement. The belt 14ª also has an adjusting roll 66, while the belt 17 has adjusting roll 67 and alining roll 68 similar to belt 11.

When it is desired to corrugate or emboss the material with some design, a suitable embossing roll is substituted for the upper roll 25 which impresses its design upon the material previous to its being cut off by the knife 11. In this case the material is not compressed in the hydraulic press.

The rotary knife for cutting the sheet of material into the desired lengths is operated by a hand wheel 69 and has means for adjustment thereof relatively to the plate 70 as illustrated in Fig. 6. The knife is mounted in a yoke 71 to which the knife is clamped by means of a bolt 72. The latter extends through a slot 73 in the knife blade, which slot allows for the adjustment of the blade upwardly or downwardly when the blade is loosened so as to unclamp the same from the yoke. The plate 70 is supported at its ends by means of two upwardly extending flanges 74 and is slightly flexible or yielding at the point of contact of the knife therewith, so as to produce a snug engagement of the knife therewith for the purpose of properly cutting off the material.

The belts 11 and 17 are supported at the table in any desired manner as by means of a plurality of small rolls 75. The moisture or water extracted from the material and also the water used in cleaning the belts may be conveniently drained by means of an inclined channel or gutter 76 running the length of the conveyer table and directly below the same and a drain pipe 77 may be formed at the lowest portion of the incline.

Any desired means may be used for adjusting the rolls for the purpose of gaging the sheet and also applying pressure thereon for expressing the moisture. I provide an adjustable bearing for each top roll which is moved up and down by a screw operated by a hand wheel 78. The two wheels for the bearings may be connected so as to rotate together by means of a sprocket chain 79 or any other suitable motion transmitting means.

Many changes may be made within the scope of this invention, and parts of the improvements may be used without the others.

Having thus described my invention, I claim as new:

1. In apparatus for molding plastic material in the form of sheets, a hopper, a chamber or casing extending therefrom, a pair of rolls mounted at the bottom of the hopper, adapted to compress and advance said material, a conveyer in said chamber disposed beyond said rolls, and a pair of gage rolls below said conveyer.

2. In apparatus for molding plastic material in the form of sheets, a hopper, a chamber or casing extending therefrom, a pair of rolls mounted at the bottom of the hopper, a screw conveyer in said chamber, and a pair of gage rolls below said conveyer.

3. In apparatus of the character described, a conveyer, adapted to carry a sheet of plastic material, means for compressing said sheet comprising a pair of rolls, means for conveying the material to said rolls, and means for applying lubricant to the surface of one of said rolls for the purpose of preventing the material adhering thereto.

4. In apparatus of the character described, a conveyer adapted to carry a sheet of plastic material, means for automatically conveying a spacing member, means for guiding said spacing member under said sheet as it passes from the conveyer, said spacing member being adapted to prevent the sheets from adhering to each other when they are compressed in a pile, and means for spreading a film of oil upon said spacing member previous to its insertion under the sheet.

5. In apparatus of the character described, a conveyer adapted to carry a sheet of plastic material, means for automatically conveying a spacing member, means for guiding said spacing member under said sheet as it passes from the conveyer, said spacing member being adapted to prevent the sheets from adhering to each other when they are compressed in a pile, and means for automatically cleaning said spacing member as it is being conveyed.

6. In apparatus of the character described, a conveyer adapted to carry a sheet of material, a second conveyer inclined to said first conveyer and extending downwardly therefrom, guides extending over the top of said inclined conveyer, said second conveyer having means for conveying a plate to the level of the first conveyer, said plate engaging said guides whereby it is positioned under the sheet of material which is fed thereon and carried thereby.

7. In apparatus of the character described, a conveyer having guiding means extending longitudinally thereof, a second conveyer inclined to said first conveyer and adapted to convey a spacing member upon which the material fed from the first conveyer is deposited, and coating means for the material arranged between said conveyers.

8. In apparatus of the character described, a conveyer adapted to convey a sheet of material, guides arranged longitudinally thereof, a second conveyer, hooks carried by said second conveyer adapted to engage a plate to be carried thereby, said plate being adapted to engage said guides and to be fed longitudinally of said conveyer in said guides from a position of inclination to said first conveyer.

9. In apparatus of the character described, a conveyer adapted to carry a sheet of material, means for feeding a spacing member to a position along said conveyer below said material so as to receive a length of material thereon, means for conveying said plate and length of material, and an adjustable run-way for guiding said plates and sheets to be piled one on top of another.

10. In apparatus of the character described, a conveyer belt adapted to carry a sheet of material, a second conveyer belt extending above the material and terminating at a point in the rear of the end of the first mentioned belt, gaging rolls mounted in advance of said second belt, and means for supplying lubricant to the upper of said rolls.

11. In apparatus of the character described, a conveyer belt adapted to carry a sheet of material, a second conveyer belt extending above the material and terminating at a point in the rear of the end of the first mentioned belt, gaging rolls mounted in advance of said second belt, means for supplying lubricant to the upper of said rolls, and means for spreading the lubricant.

12. In apparatus of the character described, a conveyer belt adapted to carry a sheet of material, a second conveyer belt extending above the material and terminating at a point in the rear of the end of the first mentioned belt, gaging rolls mounted in advance of said second belt, means for supplying lubricant to the upper of said rolls, a roll of soft material contacting with the gaging roll and adapted to spread the lubricant.

13. In apparatus of the character described, a conveyer, adapted to carry a sheet of plastic material, a flexible support in alinement with said conveyer, and an adjustable knife mounted above said flexible support for cutting said material as it passes over said support.

14. In apparatus of the character described, a table, a pair of guides mounted longitudinally thereof, a belt mounted on said table and extending below the guides, a roll mounted above the belt and having its ends fitting snugly against the guides, a roll mounted below the belt and extending under the guides, and a facing of comparatively soft material at the bottom of the guides, contacting the belt.

Signed at Poughkeepsie, in the county of Dutchess and State of New York, this 29th day of June A. D. 1912.

JOHANN FERLA.

Witnesses:
 FLORENCE CHILDS,
 A. W. HAIGHT.